United States Patent [19]

Kronogard

[11] 4,064,690
[45] Dec. 27, 1977

[54] GAS TURBINE POWER PLANT

[75] Inventor: Sven-Olof Kronogard, Lomma, Sweden

[73] Assignee: United Turbine AB & Co., Sweden

[21] Appl. No.: 638,052

[22] Filed: Dec. 5, 1975

Related U.S. Application Data

[63] Continuation-in-part of Ser. No. 471,176, May 17, 1974, Pat. No. 3,943,703.

[51] Int. Cl.$^2$ .............................. F02C 3/10; F02C 7/02
[52] U.S. Cl. .......................... 60/39.16 R; 60/39.16 S
[58] Field of Search ................. 60/39.16 S, 39.16 R; 415/205, 214; 416/241 B; 74/665 P, 665 Q

[56] References Cited

U.S. PATENT DOCUMENTS

| | | | |
|---|---|---|---|
| 2,715,011 | 8/1955 | Schorner | 415/214 |
| 2,801,519 | 8/1957 | Wood | 60/39.51 R |
| 3,488,947 | 1/1970 | Miller et al. | 60/39.16 S |
| 3,498,057 | 3/1970 | Kronogard et al. | 74/665 L |
| 3,635,577 | 1/1972 | Dee | 60/39.16 R |
| 3,905,723 | 9/1975 | Torti | 415/214 |

Primary Examiner—Carlton R. Croyle
Assistant Examiner—L. J. Casaregola
Attorney, Agent, or Firm—Holman & Stern

[57] ABSTRACT

The efficiency and the power output of a gas turbine power plant, to a large extent, depend upon the turbine inlet temperature (TIT). The strength of conventional metallic materials puts an upper limit to the TIT. Ceramic materials will withstand much higher temperatures, but their practically usable strength is considerably less than that of metallic materials.

The strains imposed upon a rotor to a large degree is a function of the centrifugal stress and thus the peripheral speed. In order to secure simplicity of design the turbine driving the compressor rotor shall be mounted upon the same shaft as the latter, which means that the turbine will rotate at the same speed as the compressor.

The specific power obtainable at, or consumable by, a rotor is approximately a function of the square of its peripheral speed, and in a conventional arrangement the turbine rotor usually has as somewhat smaller diameter then the compressor it drives, assuming that the compressor is the only power consumer.

A ceramic material will not withstand such high peripheral speeds as are used in metallic turbines, and according to the invention the first, ceramic turbine rotor driving the compressor is "undersized" and has a reduced diameter. This means that the power output of this turbine will not be sufficient to drive the compressor, so the turbine has to be supported, either by power transfer from a further turbine rotor operating on a separate shaft, or by a further ceramic rotor being mounted upon the compressor/first turbine rotor shaft.

4 Claims, 24 Drawing Figures

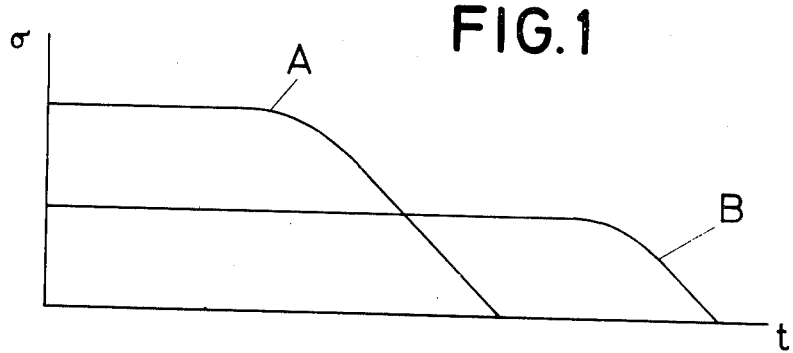
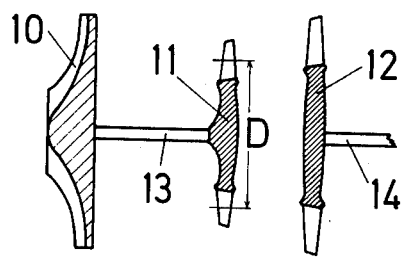
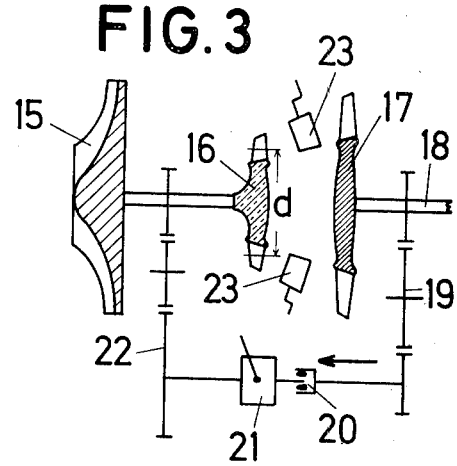
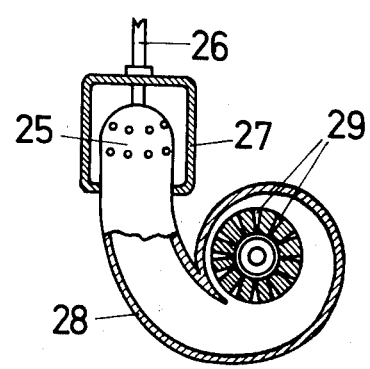
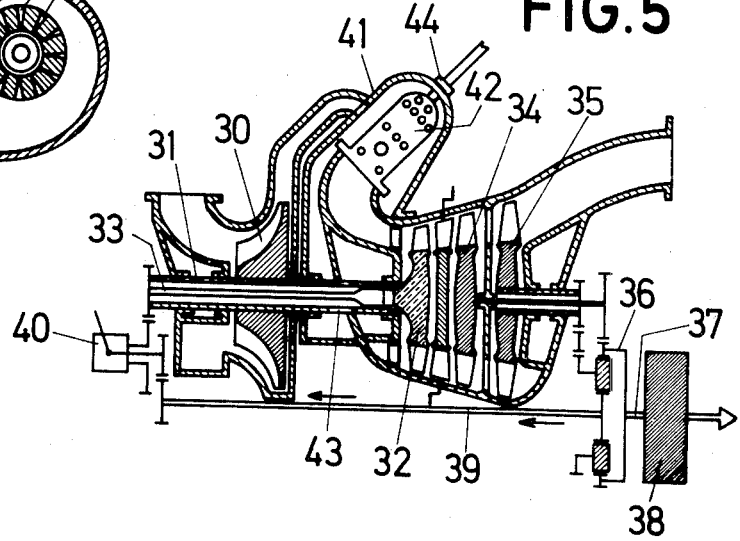

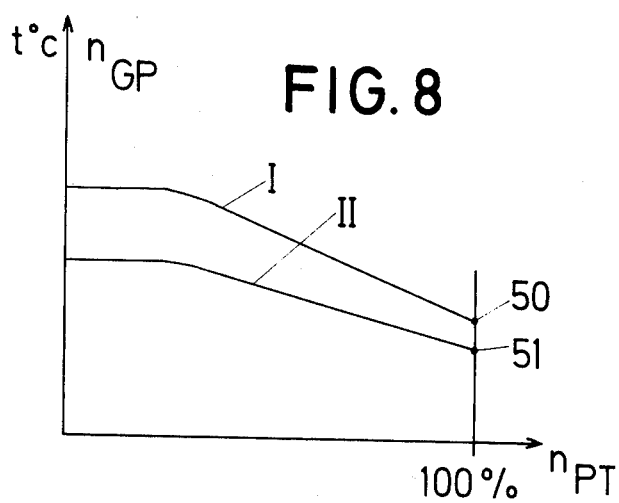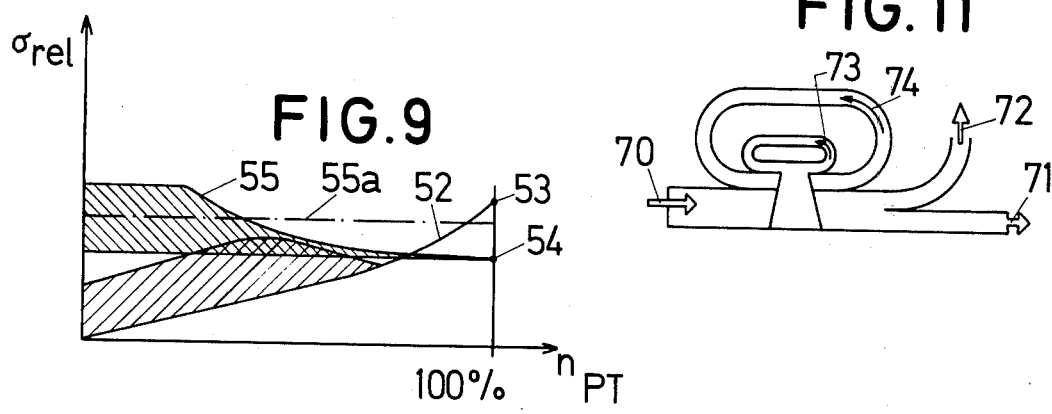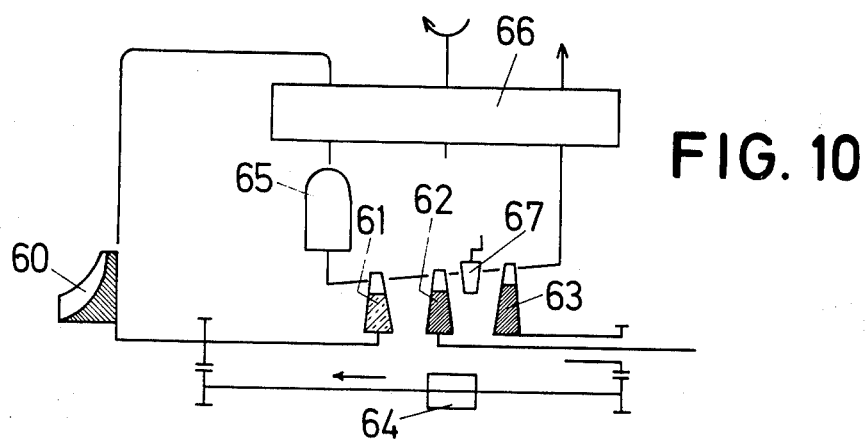

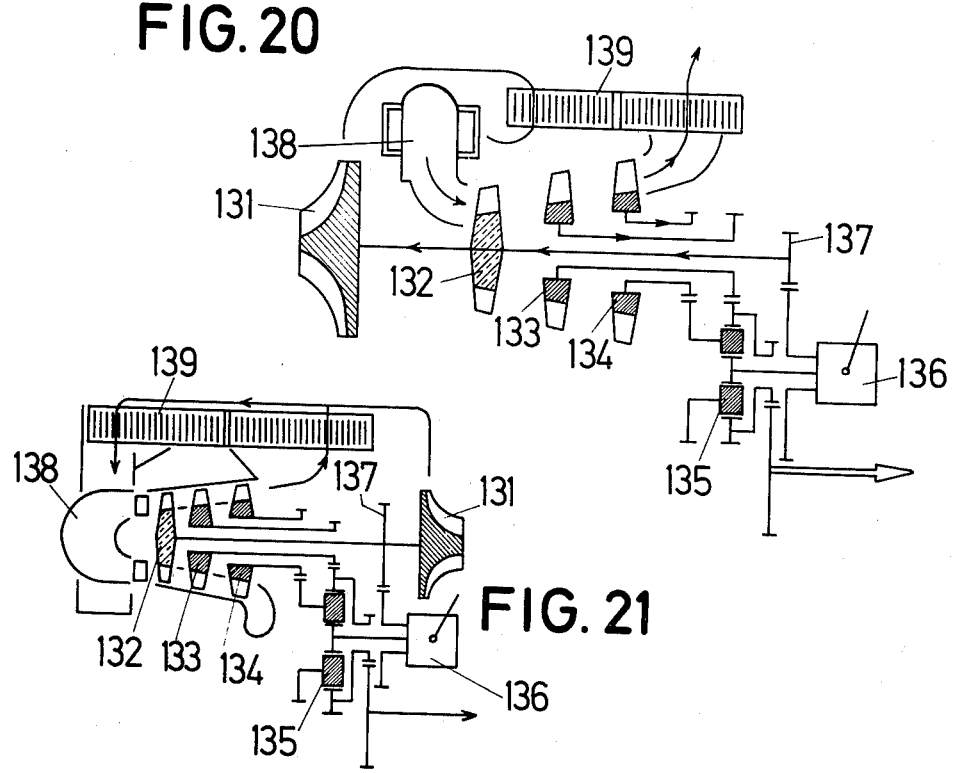
FIG. 20
FIG. 21
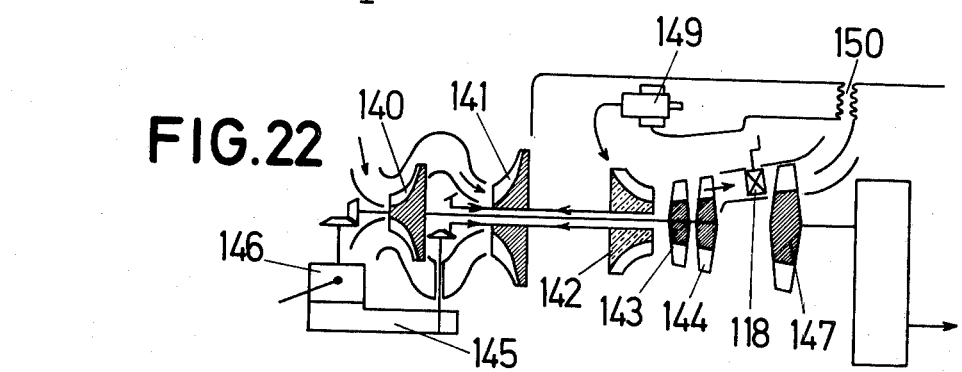
FIG. 22
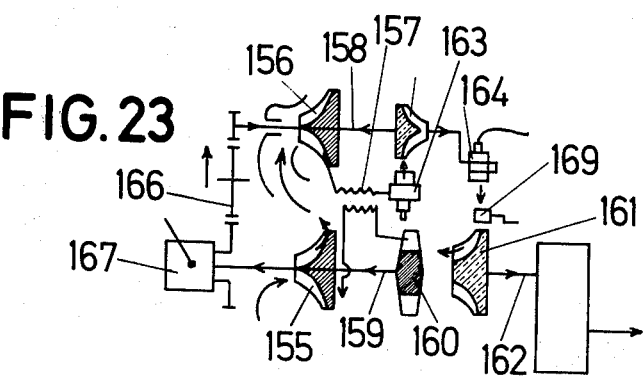
FIG. 23

GAS TURBINE POWER PLANT

This application is a continuation-in-part of application Ser. No. 471,176 filed May 17, 1974 (U.S. Pat. No. 3,943,703).

BACKGROUND OF THE INVENTION

Gas turbine power plants, especially small sized ones, where it is difficult to provide cooling of the turbine, suffer from certain disadvantages, mainly high specific fuel consumption, high costs and specific space requirements. One of the most efficient remedies is to raise the gas temperature, but the strength of conventional, uncooled metallic, heat resistant materials will set a limit to that. Ceramic materials, on the other hand, have a far better capacity to withstand high temperatures, but their strength is generally much less than that of metallic materials. For commercially available ceramic materials, suitable for mass production, the practically useful strength is roughly about one half only of the finest heat resistant metallic materials, taking brittleness and production statistics into account.

Many proposals for making turbine rotors wholly or partly of ceramic materials have been put forward, but have, so far, been no practical succes due to these limitations and to lack of full understanding of the behaviour of ceramic material and statistics from production (Weilbull's number etcetera).

In order to secure simplicity of design the turbine driving the compressor is mounted upon the same shaft as the latter. It is here presupposed that the gas turbine plant is of sufficient advanced design to have at least one further turbine delivering external power and that the components are of conventional turbo type, i.e. centrifugal or axial compressor and axial or radial turbine.

The specific power obtainable from, or consumable by a rotor is roughly proportional to the square of the peripheral speed. If a single, turbine rotor shall produce both compressor and output power the compressor and turbine diameters are, generally speaking, of about the same size.

If the turbine power is split upon two turbine rotors, of which one drives the compressor, both rotors can be designed with smaller diameters, especially the compressor driving turbine, which usually is supplied with the hot gas. This reduces the centrifugal stresses in both turbine rotors, but far from enough to make possible a practical use of present day ceramic materials.

The strength of a reproducible ceramic turbine rotor is so markedly less than that of a rotor of conventional, heat resistant metallic material, that every effect to obtain a single piece ceramic rotor, operating in conventional manner, i.e. at the same speed as the compressor, producing the required power is bound to fail. To adapt the strength of the material to the speed of the rotor it is necessary to substantially reduce the diameter and thus the peripheral speed. This will reduce the stresses imposed upon the material, but also the power obtainable from the rotor. In order to secure the power necessary for driving the compressor means must be provided for supporting the turbine.

The reduced power-generating capacity caused by the "undersized" compressor turbine will largely be compensated by the possibility to drastically increase the temperature. The increased temperature will, however, result in a bigger volume of gas. This can be compensated for by designing the turbine rotor with enlarged vane openings permitting the passage of this bigger gas volume. This will, generally speaking, means that the smaller rotor should have proportionally fewer blades with a higher "aspect ratio" than in the case with a conventional rotor. This is aerodynamically and stress-wise favourable, and can be accepted as there is no necessity to extract a maximum of power in this stage. The possibility to arrange the rotor with an increased spacing between the vanes, and also to design the same so the gas stream will pass through the rotor with small change in its angular direction, will result in a reduced resistance to flow. One way of reducing the necessary change of direction also in a stator preceeding the rotor is to locate the combustion chamber excentrically with respect to a longitudinal plane through the rotor axis, and to arrange the turbine stator in a volute chamber, whereby the gases, already when entering the stator will have a certain amount of co-rotation. This will mean a drastic reduction in size and number of blades, both in the rotor and in the stator, which for some applications can now be made without vane overlap, facilitating manufacture and reducing costs and weight.

BRIEF DESCRIPTION OF THE DRAWINGS

FIG. 1 is a diagram, schematically illustrating the relation between permissible stresses and temperature in different turbine rotor materials, FIG. 2 schematically illustrates relative sizes of rotors in a two spool turbine of conventional design, FIG. 3 schematically illustrates the same relationship in a simple turbine according to the invention, FIG. 4 is an axial view of a turbine inlet volute, FIG. 5 is a longitudinal section through a turbine according to the invention, FIGS. 8 and 9 illustrate how the speed of the compressor and turbine spool, and the turbine inlet temperature according to the invention can be varied during part load, and the influence thereof upon stresses in the first turbine rotor and in the second turbine rotor, respectively, FIG. 10 schematically illustrates a gas turbine plant provided with a heat exchanger, FIG. 11 shows how exhaust gas, aerodynamic and heat energy is regenerated in a double way within the plant, and FIGS. 12 – 23 show various embodiments of gas turbine power plants including a first turbine rotor of ceramic material being "undersized" to such a degress, that it cannot, by itself, at normal load, supply the necessary power for driving the compressor, but it is supported by at least one further turbine rotor.

DESCRIPTION OF SOME PREFERRED EMBODIMENTS

Figure 6:
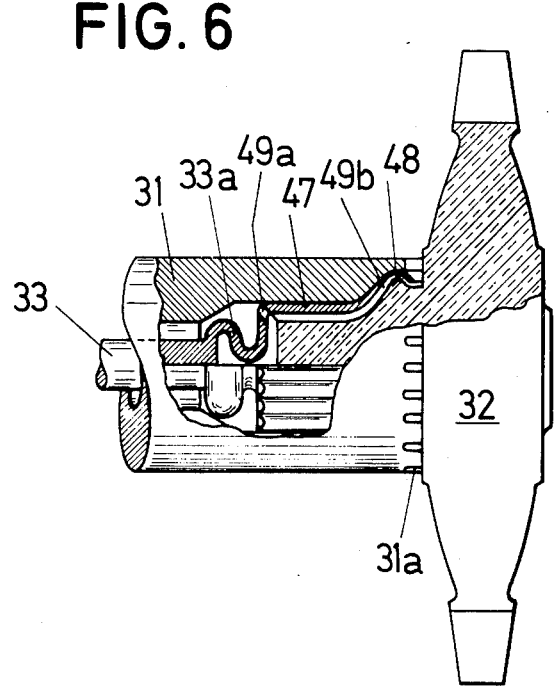
FIGS. 6 and 6a show alternative manners of attaching a ceramic rotor to a metal shaft, FIG. 7 schematically illustrates the utilization of ceramic material in different rotor combinations.

FIG. 1 very schematically shows the relationship between the permissible stress, $\sigma$, in a common metallic turbine rotor material under varying temperature conditions, $t$, compared with the corresponding practically permissible stress in a ceramic turbine rotor material.

Curve A shows that the metallic material, usually some type of heat resistant steel, has a high strength within the moderate temperature range, but that the strength rapidly falls when the temperature reaches a certain value.

Curve B shows that the ceramic material typically has a useful strength, which due to lack of elongation properties, general brittleness and statistic strength (Weibull's number) is considerably less than that of the metallic material, say, about 50% thereof only. The ceramic material will, however, maintain this strength within temperature ranges quite impossible to the (uncooled) metallic material.

For the efficiency of the thermodynamic process cycle it is most advantageous to use as high a turbine inlet temperature as possible, which suggests the use of ceramic material, especially in the hottest parts of the gas flow path, including combustion chamber, ducting inlet volute with stator and the first rotor, or rotors.

A rotating component will not only be subjected to high relative strains due to temperature and temperature gradients (transients), but also, and to a considerable degree, due to the centrifugal forces upon the disc and its vanes. The brittleness, lack of elongation properties and relatively low strength of the ceramic material will, however, impose great problems in those respects.

As mentioned in the Background of the Invention, the power obtainable from, or consumable by a rotor is roughly proportional to the (sum of the) square of the peripheral speed(s) ($u^2$) of the part(s) of the rotor(s) operating in the gas flow path.

FIG. 2 very schematically shows a conventional arrangement at a twin spool gas turbine installation including a compressor rotor 10, a turbine rotor 11 driving the same by way of a direct shaft connection 13, and a further turbine rotor 12, for delivering external power, by way of a shaft 14.

Hitherto gas turbines of this type have usually been so designed, that the compressor driving turbine rotor 11 at normal operating speed and rated full power, by itself, has the capacity for driving the compressor. According to the discussion above this requires a compressor-turbine rotor with relatively large diameter D, resulting in high stress. With several compressor-turbine stages the sum of $u^2$, the so called Parson's number, is a measure of the work capacity of the turbine rotor. To apply more stages for a given pressure ratio, and T.I.T. is a well known way of reducing centrifugal stresses.

The low strength of the ceramic material have made very complicated rotor structures and vane mountings necessary, also involving complex composite materials or so called "duo-density" wheels, too expensive for series production.

The present invention is based upon the understanding that it will with present or near future materials be practically impossible and/or too expensive even in a two shaft conventional gas turbine, like that of FIG. 2, and even more so in a 1-shaft gas turbine, to obtain the necessary power for driving the compressor from a single, low stress stage turbine rotor of ceramic material manufactured in a simple manner suitable for series production. The compressor turbine rotor is therefore according to the invention "undersized," i.e. designed with a smaller diameter than the conventional, single stage compressor-turbine rotor, and means are instead provided for mechanically supporting the compressor drive from some other turbine rotor in the system, located downstream of said first rotor.

FIG. 3 illustrates a simple arrangement for working the invention. The compressor 15 is driven by a turbine rotor 16 of underzised diameter, being incapable of supplying the necessary power for driving the compressor, but working with considerably reduced centrifugal and other stresses such as thermal transient gradients (reduced inertia and over-temperature during acceleration). The power turbine 17, beside delivering power to the power take off shaft 18, by way of a first gear train 19, a freewheel 20, an infinitely variable transmission 21 and a second gear train 22, also delivers the necessary additional amount of power for driving the compressor at full power. Adjustable inlet vanes 23 are provided between the two turbine rotors to determine the power distribution between the two rotors 11.

To permit the second turbine rotor, i.e. the power turbine to rotate and to deliver power to the compressor and auxiliaries also at stall, an output differential (like the one in FIG. 12), a torque converter or any equivalent device can be used.

Due to the very low inertia of the "undersized" turbine rotor the variable transmission and the power turbine inertia effect it is possible to obtain a fast acceleration of the gas producer part without the overtemperature occuring in a conventional plant. The "undersized" compressor turbine will thus operate at low peripheral speed and not be subjected to the same temperature gradients as in conventional turbines, which reduces the mechanical as well as the thermal strains upon the rotor, especially in its vanes and rim. This makes it possible to use available ceramic material, and also to manufacture rotor and vanes as an integral component, e.g. by sintering or hot-pressuring. It is thus possible to raise the temperature of the gases from combustion chamber, while still using a simple turbine design.

By designing the first row of inlet stator vanes in connection to a volute chamber, which provides a pre-swirl at the stator inlet, a low aerodynamic load, i.e. only a small deflection of the gas flow is required in the stator (nozzle ring). This means that it is possible to design this first row of stator values, which also are made of ceramic material, with a reduced number of vanes. This, in turn, means that the vanes can be arranged without overlap, looking in the axial direction. This design makes possible a simplified procedure of manufacture, whether injection molding and sintering, or hot pressing of the components is used. Tha same also applies to the first rotor, due to the reduced load and thus reduced number of blades.

An inlet arrangement as per above is shown in FIG. 4. A combustion chamber 25 is provided with fuel burner means 26, and is surrounded by a plenum chamber 27 supplying air from the compressor. The combustion chamber is connected to a volute 28, which feeds the inlet stator vanes 29 with a pre-swirl. The combustion chamber, as well as the volute and the inlet stator vanes, are all manufactured from ceramic material.

The raised temperature of the gases means, for a given size of turbine, an increased specific volume of gas, that has to pass through an annular passage, divided by the vanes, which for the FIG. 3 arrangement has a smaller mean diameter than that of FIG. 2.

The higher temperature of course makes it possible to extract more energy from the gases while passing through the first rotor, but on the other hand the total amount of power converted in the first rotor is, according to the invention, deliberately made less than with the FIG. 2 arrangement. This means, as pointed out before, that less deflection is required and that a reduced number of vanes can be used, meaning a bigger relative spacing, i.e. less over-lapping. This provides a further increased relative flow passage area, and will thus permit a relative reduction in passage height and thus vane length, implying a reduction of the aerodynamic and vibratory load upon the blades by the gas. The reduced relative height and weight of the blades will also reduce the centrifugal load upon blades and the rotor rim and disc.

FIG. 5 shows a further development of the invention. The compressor 30 is mounted upon a hollow shaft 31, which carriers a rotor 32 with integral vanes, made of ceramic material. This rotor is releasably and flexibly mounted upon shaft 31 by means of an internal, threaded rod 33 and nut means, not shown. Second and third rotors 34 and 35, respectively, of which at least last mentioned one is manufactured of metallic material, are arranged downstream of first rotor 32, and are both connected to a planetary gear 36.

An output shaft 37 from the ring wheel of this gear drives a load 38, while a second shaft 39 connected to its sun wheel supplies additional power for driving the compressor by way of a variable transmission 40.

Air from compressor 30 passes up to a plenum chamber 41 enclosing the combustion chamber 42. Part of the air passes downwards, and enters openings 43 in hollow shaft 31, from which it is conveyed to rotor 32 for cooling the same as well as the shaft and the flexible members locating the rotor.

The combustion chamber is provided with burner means 44. Fuel pumping and governing means (not shown) are provided to ensure a supply of fuel, resulting in gas temperatures considerably in excess of those used in conventional turbines with a first rotor of metallic material, FIG. 6 illustrates one way of resiliently mounting a rotor of ceramic material upon a metal shaft, so due consideration will be taken to the different coefficients of thermal expansion for those two materials.

Rotor 32 of the gas turbine in FIG. 5 is made of ceramic material with integral vanes and a centrally located shaft stub 46, which fits into one end of hollow shaft 31. The rod 33 extending through this shaft is at its end remote from the rotor provided with nut means for tightening the attachment.

The end of rod 33, adjacent to the rotor, is formed as an open ended sleeve having axially corrugated side walls 47 and ending in a number of axially directed bent fingers, engaging an annular bead at the root of shaft stub 46.

The connection between the open-ended sleeve clamping member and rod 33 proper is formed as an axial spring element 33a. This is desirable if the shaft end, in order to obtain a secure positioning of the rotor disc, extends so it obtains contact with the latter.

The corrugations 47 in the side walls of the sleeve clamping member must not run straight in the axial direction, but can be arranged peripherally/helically along the stub shaft.

In order to prevent mutual rotation between the clamping member and the stub shaft, and thus to facilitate torque transfer, the latter is provided with grooves for the reception of at least part of said corrugations.

As mentioned in connection with FIG. 5 air from the compressor is supplied to the interior of shaft 31. The sleeve end of rod 33 is provided with openings 49a at its inward end and slots 49b between the fingers at its outward end, so air can pass axially through fitting for cooling the same, as well as the rotor shaft, which is provided with axial slots, 31a, for the cooling air.

This fitting will maintain safe grip irrespective of thermal changes in the axial or the radial direction.

Figure 6A:
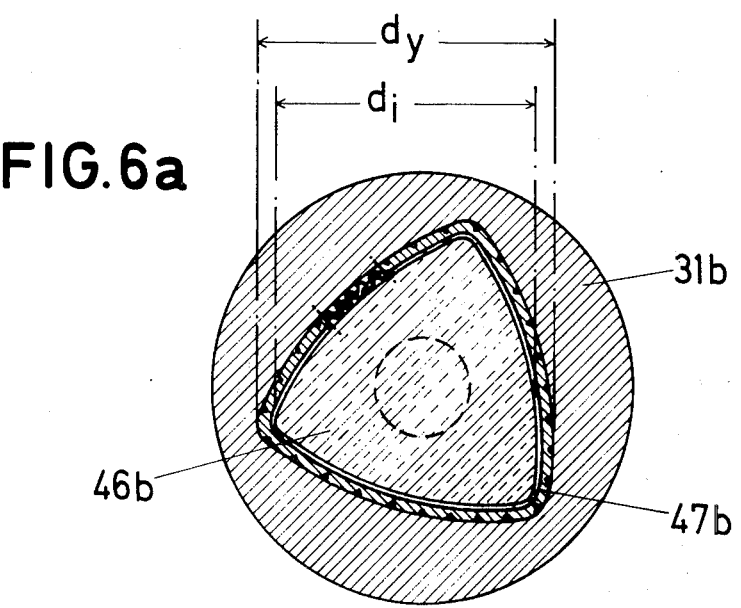

FIG. 6a illustrates an alternative type of attachment between the rotor and the clamping member. The stub shaft 46b has a polygonal cross section. The polygon shape is here of the 3-lobe type, but may have four or more lobes. The clamping member 47b, and the passage at the end of hollow shaft 31b will be formed with correspondingly shaped cross sections, however increasing in size.

A characterizing feature of a polygon shaped cross section is that the "diameter," i.e. transverse measures through the center are constant. The respective measures for the internal surface of the hollow shaft and the external surface of the stub shaft, are denoted dy and di, respectively.

These surfaces may be simply ground, and the polygonal shape will ensure a safe torque transfer.

The clamping member is here provided with transverse corrugations, provided with slots for permitting axial air flow. The transverse corrugations will ensure resiliency in the axial direction, but also compensate temperature movements in the radial direction.

Instead of transverse corrugations the clamping member may be provided with axial, or substantially axial corrugations and an axial spring member 33a, as shown in FIG. 6.

Figure 7:
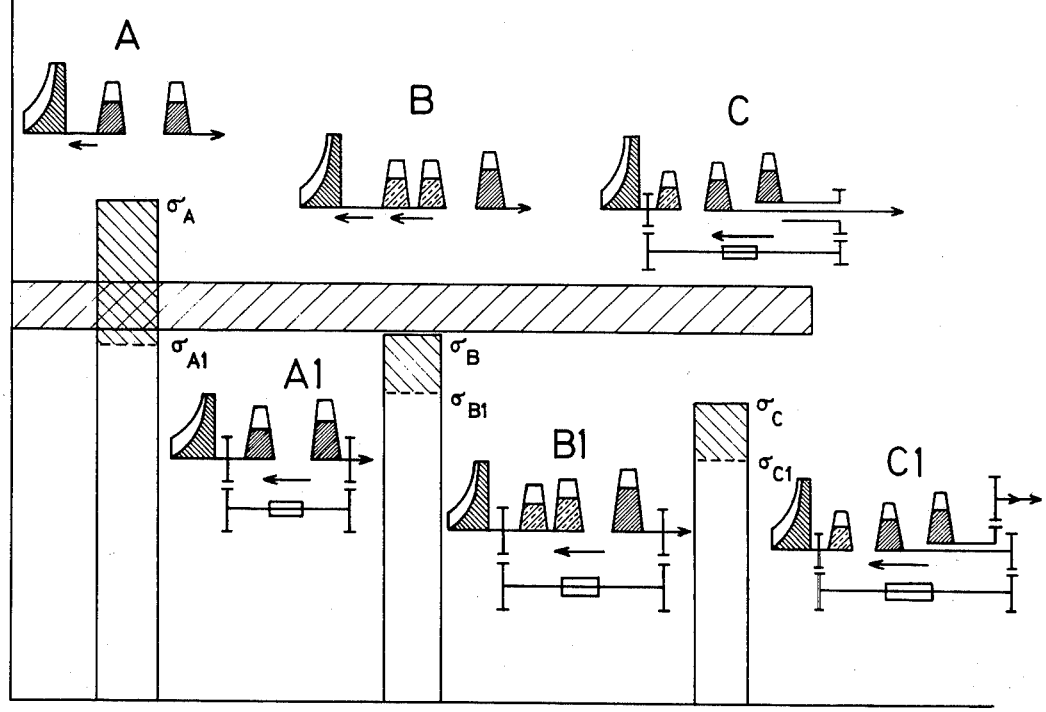

FIG. 7 illustrates how different turbine systems could operate in relation to stresses permissible with ceramic materials, commercially available. The stress level is shown as a horizontal band and stresses in the first rotor as vertical columns.

A is a conventional two-shaft engine, where the compressor turbine alone is supported to supply the compressor work, and it is evident that the stresses in the turbine rotor (mainly due to the high peripheral speed) will far exceed what is acceptable with ceramic material. A single shaft, single stage engine would be completely out of question and is not shown.

A1 shows a modification according to the invention of the embodiment above, substantially as described in connection with FIG. 3, i.e. undersized compressor turbine with driving support. This brings the stresses just into the acceptable zone.

B shows a basic embodiment according to the invention, where the first rotor stage has a reduced diameter and is for the compressor drive supported by a second turbine stage mounted upon the same shaft. The power turbine operates on a separate shaft. This arrangement will also bring the stresses in the first two turbine rotors down to the level permissible for ceramic materials.

C illustrates a further modification according to the invention including three rotors operating on individual shafts. The first turbine rotor has a diameter, which is further reduced, when compared with the B arrangement. Additional power for the compressor drive is supplied by a transmission from the third rotor. This will bring the stresses in the first turbine rotor well below the permissible level. The stress level referred to includes mechanical stresses as well as thermal stresses during normal operation and especially during transient periods.

In the versions of the invention, where a variable transmission is used to accelerate the compressor spool by inertia energy from the other turbine rotors, a rapid acceleration is obtainable without the additional fuel supply, above the requirement for full load which is common with conventional gas turbines. This additional fuel supply results in momentary overtemperatures which are very detrimental to the useful lifetime of the rotor.

The possibility to avoid such over-temperatures means that a cheap material can be used, or, with higher class material, that weight and space requirements can be reduced.

The reduced thermal shocks will also mean a substantial reduction of the exhaust emission concents, especially NOx.

The gas producer part of a gas turbine plant will usually operate with reduced efficiency as soon as the plant is run below its nominal design speed, i.e. reduced pressure and temperature. As the thermal shocks can be reduced when using the invention, the thus created reserve in thermal fatigue lifetime can be temporarely used to run the gas producer part, i.e. the compressor + the first turbine stage, at higher temperatures and/or increased rotational speed than is permissible in a conventional turbine at nominal working speed, when the power turbine operates in the lower speed range and thus lower stress level. This means that a higher pressure ratio and bigger gas flow and thus a higher power can be applied to the gas producer. This means that higher torque ratings at start and low speeds, without using extra transmission or power boost means, which is extremely valuable.

As the turbine plant will normally operate within the low speed range, and during a limited amount of time only, the higher temperature and/or speed levels, this increase will not have too strong an influence upon the "undersized" turbine rotor, especially if only one of said parameters is varied.

The power turbine rotor will not be seriously influenced by the temporary increase of the temperature as the increased thermal loads caused thereby will only appear when the rotor operates in the low speed range and thus at reduced mechanical loads, the latter being proportional to the square of the (reduced) speed.

FIG. 8 is a simple diagram in which the temperatures $t°C$ and the speed of the gas producer portion ($n_{GP}$) are on the ordinate and the speed of the power turbine ($n_{PT}$) on the abscissa.

Curve I of FIG. 8 illustrates possible variations in turbine inlet temperature in the operating range below 100% power turbine speed. In the same manner curve II illustrates possible variations in compressor and compressor-turbine speed up to 100% power turbine speed. Points 50 and 51, respectively, indicate the turbine inlet temperature and the compressor-turbine speed, respectively at nominal working speed, i.e. 100% power turbine speed.

FIG. 9 illustrates the influence of increased temperature and/or speed upon the rotor components in the plant. The relative stress $\sigma$ rel, using the ratio of the actual momentarily and the continuously permissible stresses ($\sigma$act./$\sigma$permissible) is shown on the ordinate and the power turbine speed ($n_{PT}$) on the abscissa. $\sigma$rel lies as an average, according to the design, below the otherwise maximal acceleration stress of a conventional turbine (line 55a).

The stresses in the power turbine rotor will normally vary along curve 52 to a highest value 53 at 100% nominal working speed. The stresses in the compressor-turbine rotor will only reach a noticably lower value, indicated at 54, at this nominal speed.

If the turbine inlet temperature and/or the compressor turbine speed is increased, as indicated in FIG. 8 the stresses will, during short moments, increase along curve 55.

The momentarily increased stresses in the compressor turbine rotor are acceptable as the otherwise common thermal shocks (indicated by line 55a) can be avoided and it is evident that the stresses in the power turbine rotor will not exceed the maximum value, reached at 100% working speed, which for an ordinary car engine is used for a very short part of its lifetime.

The above power boost feature of low and intermediate speeds can optionally be used as a "kick-down" (KD) feature, and thus be relied upon at occasions only, when a special power need occurs and the throttle already is pressed to its wide open position, similar to a KD in an automatic vehicle transmission.

A gas turbine power plant of this type is, for automotive applications, preferably provided with a ceramic heat exchanger, in which the heat content of the gases leaving the last turbine stage is utilized for preheating the air flowing to the combustion chamber in the usual manner.

FIG. 10 schematically shows a basic arrangement of a triple-rotor gas turbine having a rotating regenerative heat exchanger.

The compressor is denoted by 60 and the three turbine rotors by 61, 62 and 63, respectively. Rotor 62 is the power turbine, rotor 61 is directly connected to the compressor and rotor 63 supplies additional power to the compressor spool by way of transmission 64. Rotor 63 will also supply power to auxiliaries and/or possibly also to the power output shaft by way of further transmissions, not shown.

The combustion chamber is denoted by 65 and the heat exchanger by 66. Variable inlet vanes 67 are provided between rotors 62 and 63 to make possible a distribution of the available gas energy between said two rotors. A similar result can be obtained if variable inlet vanes are fitted between the first and the second turbine rotors, and the latter is used for supporting the compressor turbine, while the third turbine rotor is the power turbine.

The FIG. 10 arrangement is especially suitable in automotive power plants, where the power turbine rotor, 62, is connected to the vehicle wheels by a transmission in such a manner that this rotor will cease to rotate, when the vehicle is brought to a standstill.

By locating the auxiliary turbine 63 downstream of the power turbine rotor 62 it is possible, by adjustment of the guide vanes 67 to utilize the outlet energy of the gases leaving rotor 62. Hereby a double regenerative system is obtainable by stage 63 utilizing the aerodynamic exhaust energy from the power turbine and further by reclaiming of heat loss energy in the heat exchanger.

This is schematically illustrated in FIG. 11, where 70 denotes the energy content of the fuel supplied, 71 denotes the power extracted and 72 indicates unavoidable losses. A certain amount of the exhaust energy is reclaimed after rotor 62 in 63 as indicated at 73 and the heat recovery in heat exchanger 66 is indicated by 74.

Figure 12:
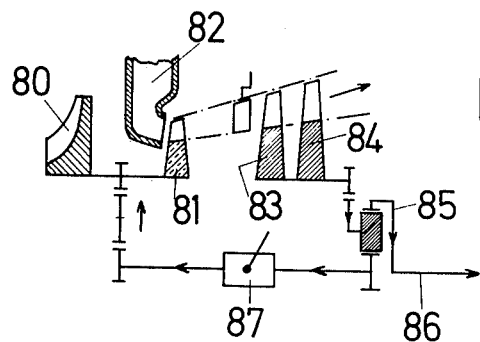

FIG. 12 shows a modified embodiment. The compressor 80 is driven by an "undersized" tubine rotor 81 of ceramic material, mounted upon the same shaft as the compressor. Gas flows from combustion chamber 82 through the first rotor, and then through a power turbine having two rotors 83 and 84 mounted upon the same shaft. The output shaft is connected to a planetary gear 85, from which there is a power take off 86 and a communication including a variable transmission 87 to the compressor - first turbine spool.

Figure 13:
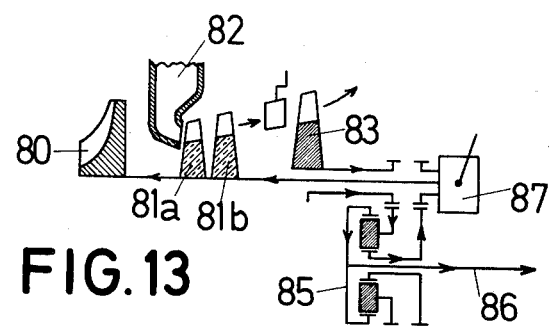

FIG. 13 shows a variation of the arrangement according to FIG. 12, and the same reference numerals are used. There are, however, two "undersized" ceramic rotors 81a and 81b for the primary drive of the compressor, which makes possible a still higher gas cycle temperature. Only one power turbine rotor 83 is shown, but it is evident that a two stage turbine, as in FIG. 12, may be used.

The two turbine shafts are concentric which permits a more compact arrangement. The two stage ceramic rotor can be sintered into an integral unit with strong solid discs. A required intermediate stator ring is then divided into segments to permit assembly.

In all previous installations the first rotors have been of the axial, or mixed axial-radial outward type. Certain advantages, especially with respect to the manufacture of components in ceramic material, are obtainable if the first turbine rotor is designed as a radial-inward flow unit. The vanes thereof may be axially-radially straight and slightly tapered. Further the vanes can be made thicker and spaced more apart than in the axial type, which simplifies part of the manufacturing procedure.

Figure 14:
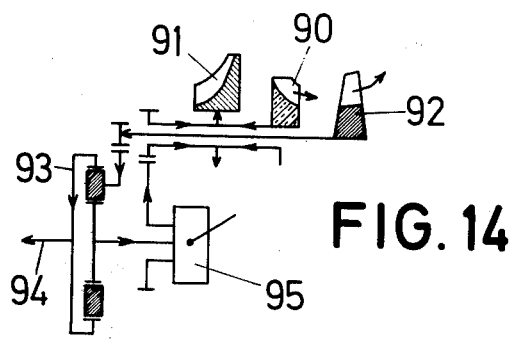

FIG. 14 shows a first embodiment of a plant having a first turbine rotor 90 of the radial-inward flow type and manufactured from ceramic material. This rotor is mounted upon a hollow shaft also carrying the compressor 91. A power turbine rotor 92 is mounted upon a shaft passing through the first mentioned hollow shaft. Both shafts are connected to planetary gear 93 having an output shaft 94. A variable transmission 95 ensures that the compressor is supplied with the necessary additional power.

Figure 15:
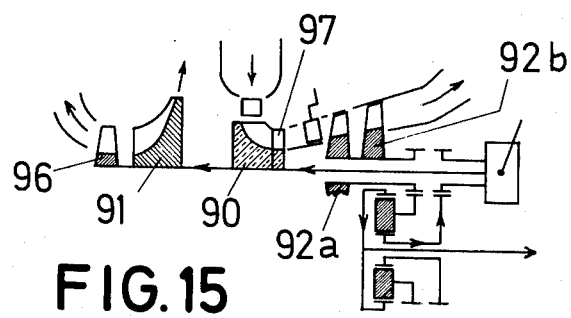

FIG. 15 shows a developement of the arrangement according to FIG. 14. There is an axial, pre-compression stage 96 upstream of the centrifugal compressor stage 91, and an axial outlet wheel, or exducer 97 downstream of the radial turbine rotor. This exducer is preferably, but not necessarily, manufactured from ceramic material, and can be dispensed with in certain applications and performance requirements. For manufacturing reasons the rotor and the axial wheel are preferably manufactured separately, and are mounted together upon the common shaft. The power turbine includes two rotors 92a and 92b.

Figure 16:
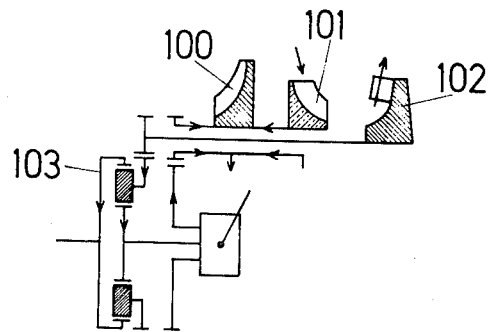

In the arrangement according to FIG. 16 the single stage centrifugal compressor 100 is directly driven by a radial flow turbine rotor 101 made of ceramic material. The power turbine 102 is also of the radial flow type, but whereas the gas in the first rotor flows radially inwards it flows radially outwards in the second stage. The two rotor shafts are connected to a planetary type gear 103, and variable transmission directs the necessary power for augmenting the compressor drive to the shaft of the compressor - first turbine rotor combination.

The second rotor may be manufactured from heat-resistant metallic material and has a high power capacity due to its big diameter. The big inertia of this second rotor acts as a flywheel which may be used in an automatic installation for accelerating the compressor after a stop. With a planetary gear and clutch arrangement it is possible to block, unload, or idle the power take-off while having the gas generator idling. Transfer of inertia energy from the second rotor to the compressor rotor will rapidly bring the gas producing part of the installation to full capacity. At the same time the reaction torque from the planetary gear is immediately giving full torque to the vehicle wheels, making possible a faster acceleration than with a piston engine.

Figure 17:
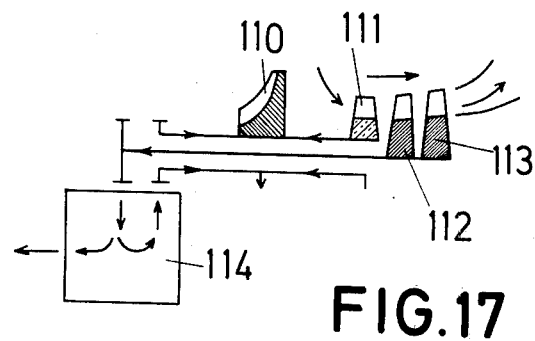

FIG. 17 shows a modification of the arrangement according to FIG. 12. The single stage centrifugal compressor 110 is driven by an axial type, low inertia turbin rotor 111 made of ceramic material and mounted upon the hollow compressor shaft. A two stage power turbine 112, 113 is mounted upon a shaft passing through the compressor shaft. Both shafts co-operate with a gear box 114, of a type equal to the one described above, which includes means for diverting a portion of the power from the power turbines to the compressor and transfer of inertia impuls from the power turbine section to the compressor rotor, as well as transfer of reaction torque to the output shaft.

Figure 18:
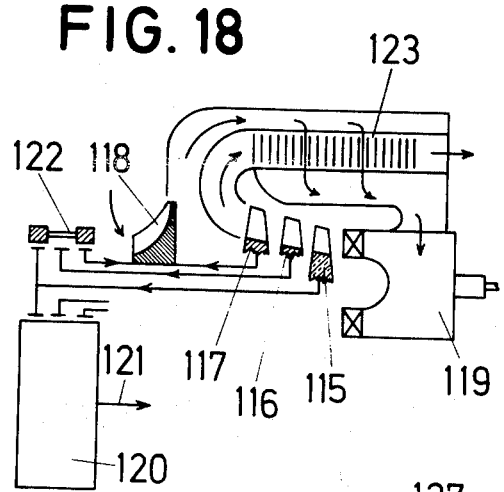

The plant according to FIG. 18 includes three axial flow turbine rotors 115, 116 and 117 mounted upon concentric shafts. The single stage centrifugal compressor 118 is mounted upon the outermost shaft, which also carries turbine rotor 117. The turbine rotor 115 located immediately downstream of the combustion chamber 119 is made of ceramic material and is mounted upon the innermost shaft which preferably is supported in airbearings of suitable type.

The intermediate rotor 116 is the power turbine and is connected to a suitable gear box 120 having a power take-off 121. The shafts of rotors 115 and 116 are interconnected by a one-piece, twin-pinion device 122 so both rotors take part in driving the compressor as being rotationally connected to the same shaft. Further means (not shown) may be included for the transfer of power both ways between this shaft system and gear box 120, in which case the twin-pinion one-piece gear 122 is substituted by a two-piece gear and suitable connecting gear and a variable transmission.

A heat exchanger 123 of the rotary type receives the gases from the last turbine stage, 117, and preheats the air passing from compressor 118 to combustion chamber 119.

Figure 19:
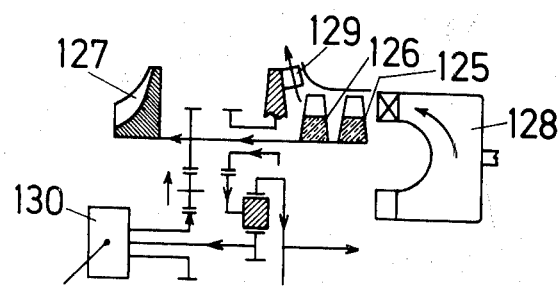

In the FIG. 19 arrangement two ceramic, axial flow turbine rotors 125 and 126 are mounted upon the same shaft as a compressor 127, and are fed with gases from a combustion chamber 128.

The power turbine 129 is of the radial-outward flow type and is mounted upon a shaft enclosing the compressor shaft. Both shafts are, as in several of the previous embodiments, connected to a common planetary gear including a variable transmission 130 for diverting power to the compressor.

FIG. 20 shows a plant in which the single stage centrifugal compressor 131 is primarily driven by an undersized ceramic rotor 132. The plant includes two further turbine rotors 133 and 134, interconnected by a planetary gear 135, with associated variable transmission 136 and feedback 137 to the compressor. The combustion chamber is denoted by 138, and a rotating heat exchanger by 139.

In the embodiment according to FIG. 21 the same components as in FIG. 20 are involved and are denoted by the same reference numerals. The difference is to be found in the locations of the components, with the combustion chamber 138 located at one end of the plant and with compressor 131 at the remote end thereof.

FIG. 22 shows a gas turbine power plant including a two stage compressor 140, 141, a first radial-inward flow turbine rotor 142 made of ceramic material and driving the second compressor stage 141 by way of a hollow shaft. There are furthermore two axial flow turbine rotors 143 and 144 mounted upon the common shaft, passing through the first mentioned, hollow shaft for driving the first compressor shaft 140.

A transmission 145 including two bevel gear combinations and a variable component 146 is fitted to transfer power from the first compressor stage shaft to the shaft of the second compressor stage.

The two axial flow rotors 143 and 144, or in any case the upstream one, may be manufactured from ceramic material. The power turbine rotor 147 is a single stage unit and is provided with variable inlet vanes 118. The plant further includes a combustion chamber 149 and a heat exchanger 150.

The plant according to FIG. 23 is also provided with a two-stage compressor 155, 156, but here the second stage 156, as well as the turbine rotor 157 driving the same, are mounted upon a shaft 158, which is laterally displaced with respect to shaft 159 connecting the first compressor stage 155 with its turbine rotor 160.

The power turbine 161 is mounted upon a shaft 162, which is aligned with shaft 159 of the first compressor stage. There is a first combustion chamber 163 upstream of turbine rotor 157, and a second combustion chamber 164, downstream thereof. Power turbine 161 will thus be fed with comparatively hot gases, and is, like rotor 157, manufactured from ceramic material.

The axial stage 160 is the last rotor in the flow path and downstream of said rotor there is a heat exchanger 165. A gear train 166 including a variable component 167 permits transfer of power from shaft 159 to shaft 158. Variable inlet vanes 169 are fitted at power turbine 161.

The ceramic rotors 157 and 161 are, for reasons stated above, designed as radial flow units. This makes possible a very compact arrangement, possibly with both rotors built into one compact single ceramic or ceramic lined housing.

What I claim is:

1. In a gas turbine power plant comprising a compressor, a first turbine rotor mounted upon the same shaft as, and imparting rotary movement to said compressor, at least one further turbine rotor mounted upon a shaft separate from that of the said first turbine rotor and compressor rotor combination, and at least one combustion chamber having fuel supply means, receiving air from the compressor and supplying combustion gas to said first and at least one further turbine rotor, the improvement, that the fuel supply means are adjustable to make the combustion chamber issue gases having temperatures above 1000° C, that at least the vanes of said first turbine rotor are manufactured from ceramic material and that the diameter of said first rotor is smaller than that required to produce the power necessary to drive the compressor, and means for mechanically supplying the additional driving power necessary to provide the total required compressor work, said means including a variable transmission between said further rotor and said first turbine rotor.

2. The gas turbine power plant according to claim 1 in which said turbine rotors are of the axial flow type and the combustion chamber is located eccentrically with respect to a longitudinal plane through the axis of said first turbine rotor, which is provided with a volute chamber forming the entrance to said rotor and delivering gas with high inlet swirl to said first turbine rotor.

3. The gas turbine power plant according to claim 2 in which the first turbine rotor is provided with an inlet stator composed of radially directed vanes, the number of said vanes being so low that, looking in the axial direction, there is no vane overlap.

4. The gas turbine power plant according to claim 2 in which the shape and the number of the blades of the first turbine rotor are selected so there is no blade overlap, as viewed in the axial direction.

* * * * *